US011731363B2

(12) United States Patent
Cano et al.

(10) Patent No.: US 11,731,363 B2
(45) Date of Patent: Aug. 22, 2023

(54) ADDITIVE MANUFACTURING SYSTEM LEAK CONTROL

(71) Applicant: HEWLETT-PACKARD DEVELOPMENT COMPANY, L.P., Houston, TX (US)

(72) Inventors: Emilio Carlos Cano, Rubi (ES); Ignacio Alejandre, Sant Cugat del Valles (ES); Esteve Comas, Sant Quirze del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 695 days.

(21) Appl. No.: 16/071,197

(22) PCT Filed: May 12, 2016

(86) PCT No.: PCT/US2016/031971
§ 371 (c)(1),
(2) Date: Jul. 19, 2018

(87) PCT Pub. No.: WO2017/196322
PCT Pub. Date: Nov. 16, 2017

(65) Prior Publication Data
US 2021/0170687 A1 Jun. 10, 2021

(51) Int. Cl.
*B29C 64/364* (2017.01)
*B29C 64/393* (2017.01)
(Continued)

(52) U.S. Cl.
CPC ............ *B29C 64/364* (2017.08); *B29C 64/25* (2017.08); *B29C 64/393* (2017.08); *B33Y 40/00* (2014.12);
(Continued)

(58) Field of Classification Search
CPC ...................................................... B29C 64/25
See application file for complete search history.

(56) References Cited

U.S. PATENT DOCUMENTS

2003/0235635 A1* 12/2003 Fong ......................... F24F 8/10 425/73
2004/0166187 A1* 8/2004 Fong ..................... B33Y 40/00 425/130

(Continued)

FOREIGN PATENT DOCUMENTS

CN 102205334 A * 10/2011
EP 0949993 11/2002

(Continued)

OTHER PUBLICATIONS

Landoni, B.; "The 3DRAG CHOCO (Chocolate 3d Printer) Cooling System Explained"; Nov. 11, 2015; http://www.open-electronics.org/the-3drag-choco-chocolate-3d-printer-cooling-system-explained/.

*Primary Examiner* — Matthew J Daniels
*Assistant Examiner* — Andrew L Swanson
(74) *Attorney, Agent, or Firm* — Shook, Hardy & Bacon L.L.P.

(57) ABSTRACT

In one example, an additive manufacturing system. An unsealed air supply enclosure for clean air is maintained at a first pressure above an ambient air pressure to inhibit unfiltered ambient air from leaking into the enclosure. An unsealed processing chamber is maintained at a second pressure below the ambient air pressure to inhibit processing chamber air from leaking out of the processing chamber. An air pathway is disposed between the air supply enclosure and the processing chamber to provide clean air from the air supply enclosure to the processing chamber.

15 Claims, 5 Drawing Sheets

200 242 243 250 248 297 OUT FAN SPEED 296 PC PRESSURE 295 CONTROLLER 280 282 284 225 -15 Pa 294 246 227 248 246 244 242 244 260 285 205 260 0 Pa BUILD CHAMBER 240 270 A 270 B 270 C 270 D 270 E 270 F 212 215 214 213 272A 272B 272C 272D 272E 272F AIR SUPPLY ENCLOSURE 210 216 224 +15 Pa 222 220 219 226 225 ASE PRESSURE INLET FAN SPEED 218 227

(51) Int. Cl.

| | |
|---|---|
| ***B29C 64/25*** | (2017.01) |
| ***B33Y 40/00*** | (2020.01) |
| *B33Y 10/00* | (2015.01) |
| *B33Y 30/00* | (2015.01) |
| *B33Y 50/02* | (2015.01) |

(52) U.S. Cl.

CPC ............... *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2008/0006334 | A1 | 1/2008 | Davidson | |
| 2015/0035206 | A1* | 2/2015 | Maggiore | B29C 64/25 264/401 |
| 2015/0321255 | A1 | 11/2015 | Colin | |
| 2016/0067779 | A1 | 3/2016 | Dautova | |
| 2016/0339634 | A1* | 11/2016 | Fuller | B29C 64/209 |
| 2017/0128601 | A1* | 5/2017 | DeCiccio | A61L 9/14 |

FOREIGN PATENT DOCUMENTS

| | | |
|---|---|---|
| EP | 1375115 | 1/2004 |
| EP | 2620241 | 7/2013 |
| EP | 2730353 | 5/2014 |
| JP | 03-064477 | 3/1991 |
| WO | WO-2015001241 | 1/2015 |

* cited by examiner 200
242
243
250
248
297
OUT FAN SPEED
CONTROLLER 280
296
PC PRESSURE
282
284
295
-15 Pa
294
225
246
227
248
205
260
244
242
244
260
265
0 Pa
BUILD CHAMBER 240
270
A
B
C
D
E
F
212
215
214
213
272A
272B
272C
272D
272E
272F
AIR SUPPLY ENCLOSURE 210
216
224
+15 Pa
222
220
219
226
225
ASE PRESSURE
INLET FAN SPEED
218
227

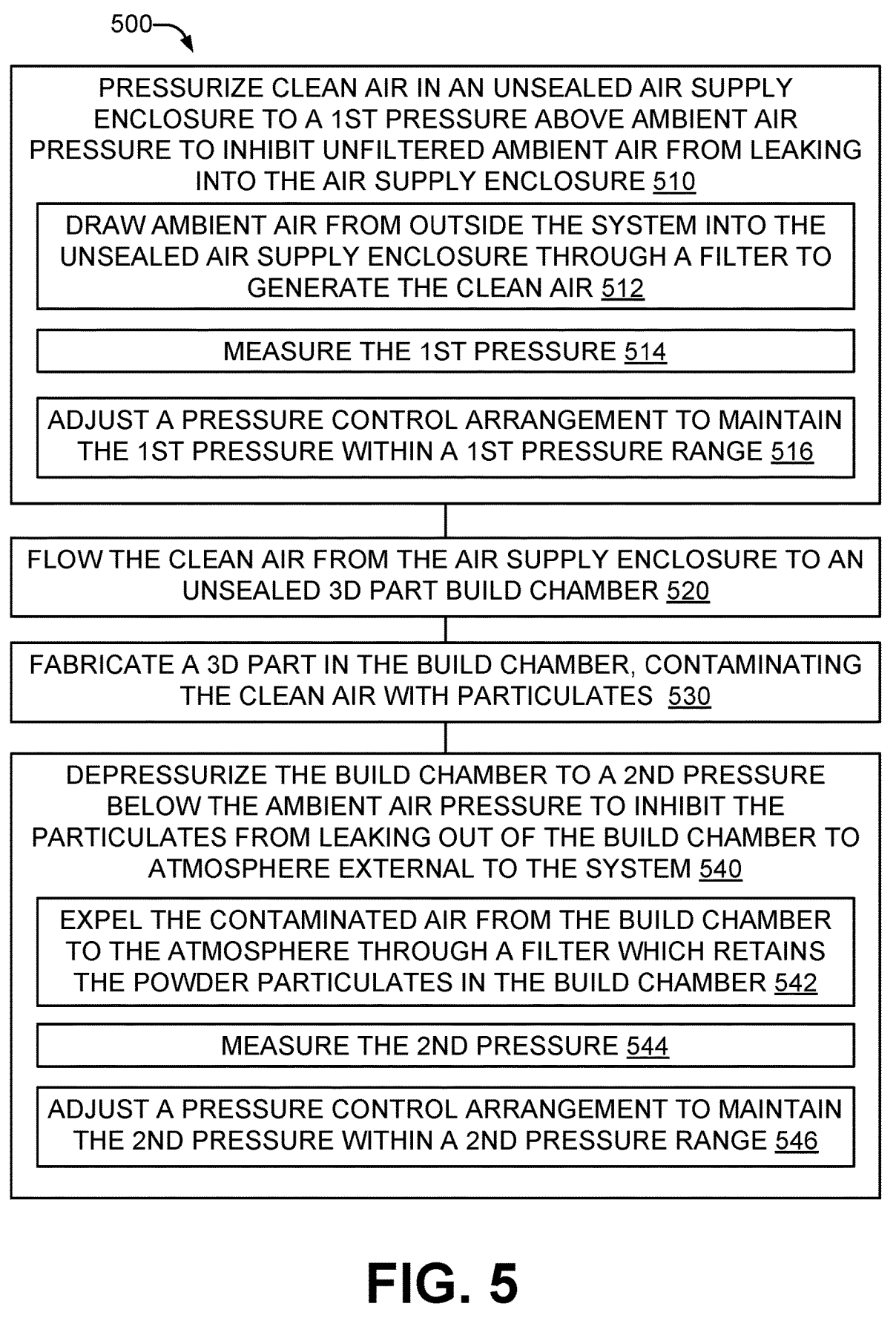

500

PRESSURIZE CLEAN AIR IN AN UNSEALED AIR SUPPLY ENCLOSURE TO A 1ST PRESSURE ABOVE AMBIENT AIR PRESSURE TO INHIBIT UNFILTERED AMBIENT AIR FROM LEAKING INTO THE AIR SUPPLY ENCLOSURE 510

DRAW AMBIENT AIR FROM OUTSIDE THE SYSTEM INTO THE UNSEALED AIR SUPPLY ENCLOSURE THROUGH A FILTER TO GENERATE THE CLEAN AIR 512

MEASURE THE 1ST PRESSURE 514

ADJUST A PRESSURE CONTROL ARRANGEMENT TO MAINTAIN THE 1ST PRESSURE WITHIN A 1ST PRESSURE RANGE 516

FLOW THE CLEAN AIR FROM THE AIR SUPPLY ENCLOSURE TO AN UNSEALED 3D PART BUILD CHAMBER 520

FABRICATE A 3D PART IN THE BUILD CHAMBER, CONTAMINATING THE CLEAN AIR WITH PARTICULATES 530

DEPRESSURIZE THE BUILD CHAMBER TO A 2ND PRESSURE BELOW THE AMBIENT AIR PRESSURE TO INHIBIT THE PARTICULATES FROM LEAKING OUT OF THE BUILD CHAMBER TO ATMOSPHERE EXTERNAL TO THE SYSTEM 540

EXPEL THE CONTAMINATED AIR FROM THE BUILD CHAMBER TO THE ATMOSPHERE THROUGH A FILTER WHICH RETAINS THE POWDER PARTICULATES IN THE BUILD CHAMBER 542

MEASURE THE 2ND PRESSURE 544

ADJUST A PRESSURE CONTROL ARRANGEMENT TO MAINTAIN THE 2ND PRESSURE WITHIN A 2ND PRESSURE RANGE 546

FIG. 5

ADDITIVE MANUFACTURING SYSTEM LEAK CONTROL

BACKGROUND

Additive manufacturing systems are increasingly being used to fabricate three-dimensional physical objects for prototyping and/or production purposes. The physical object is constructed layer-by-layer. Some additive manufacturing systems utilize hermetically-sealed enclosures filled with inert gases, and/or are located and operated in specially-controlled environments.

BRIEF DESCRIPTION OF THE DRAWINGS

FIG. 5 is a flowchart according to an example of the present disclosure of a method of operating an additive manufacturing system.

DETAILED DESCRIPTION

Figure 1:
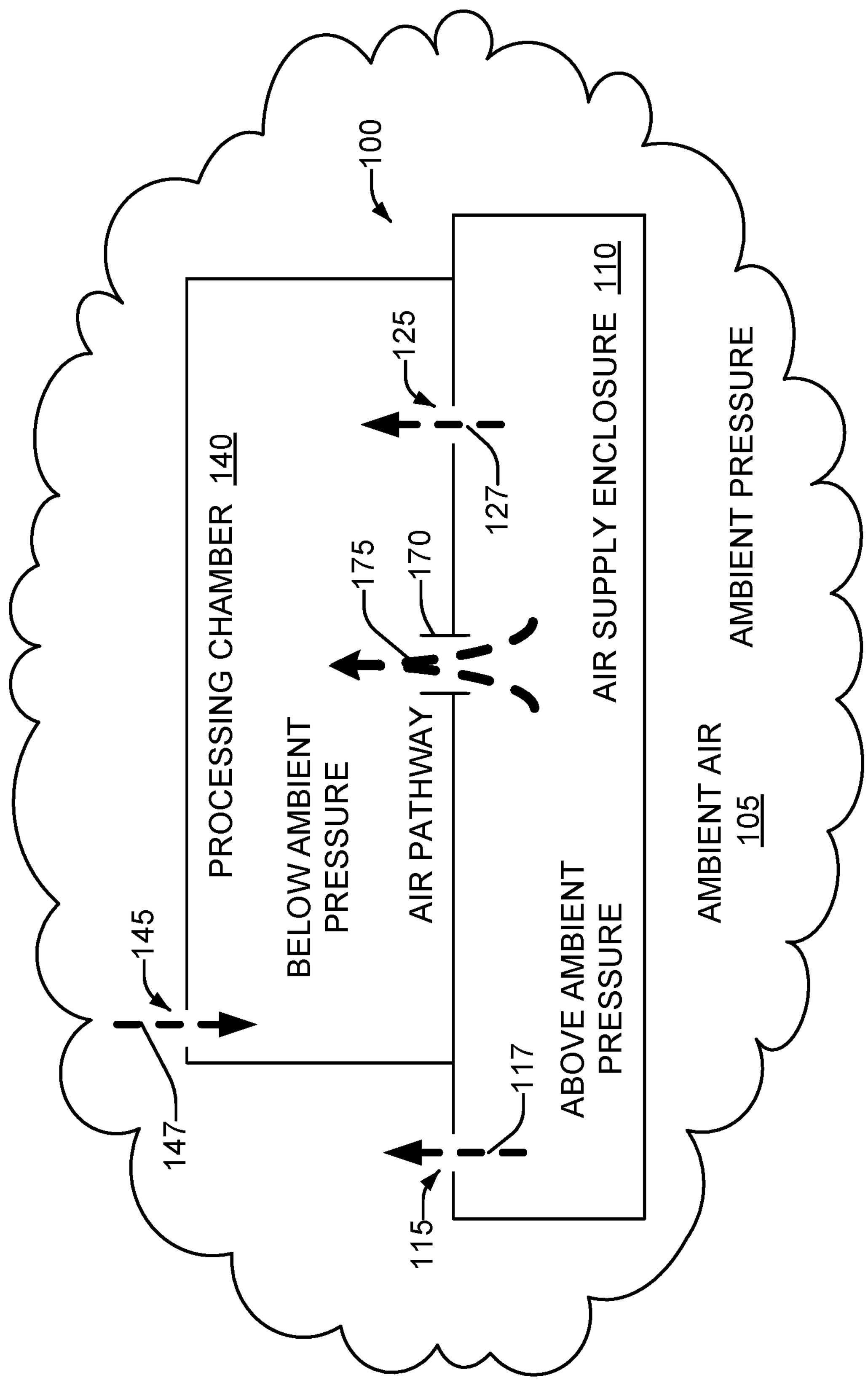
FIG. 1 is a schematic representation of an additive manufacturing system in accordance with an example of the present disclosure.

In additive manufacturing systems, a 3D digital representation (design) of the object to be fabricated may first be divided ("sliced") into a series of thin, adjacent parallel planar slices. The 3D object may then be fabricated by printing the object layer-by-layer. Each slice of the representation corresponds to a layer of the physical object to be printed. During fabrication, the next layer is formed on top of the adjacent previous layer. In one example, each layer is about 0.1 millimeter in thickness. Such a fabrication process is often referred to as "additive manufacturing":

Some additive manufacturing systems use a build material as the material from which each layer is fabricated. In one example, the build material is a fine powder, such as for example polyamide (nylon). In one example, the polyamide particles are in the range of 20 to 80 microns in size. In one example, the particles have an average size of 50 microns. During fabrication of each layer, the regions of the build material which correspond to the location of the object within the corresponding slice, are selectively fused together, while the other regions remain in unfused form. Once the object is completely fabricated, any unfused build material is removed, leaving the fabricated 3D object behind. In some examples, the unfused build material is removed within the additive manufacturing system, while in other examples the unfused build material is removed external to the additive manufacturing system.

In one example, the additive manufacturing system may have a build mechanism which uses a laser to selectively fuse the build material layer-by-layer. To do so, the laser is accurately positioned to irradiate the regions of the build material to be fused in each layer. Such a laser-based system with accurate position control for the fusing laser can be costly, however.

Another example additive manufacturing system may have a build mechanism that uses a simpler and less expensive heat source to fuse the build material in each layer, instead of a laser. The build material may be of a light color, which may be white. In one example, the build material is a light-colored powder. A print engine controllably ejects drops of a liquid fusing agent onto the regions of powder which correspond to the location of the object within the corresponding digital slice. In various examples, the fusing agent is a dark colored liquid such as for example black pigmented ink, a UV absorbent liquid or ink, and/or other liquid(s). A heat source, such as for example one or more infrared fusing lamps, is then passed over the entire print zone. The regions of the powder on which the fusing agent have been deposited absorb sufficient radiated energy from the heat source to melt the powder in those regions, fusing that powder together and to the previous layer underneath. However, the regions of the powder on which the dark colored liquid have not been deposited remain light in color, and as such do not absorb sufficient radiated energy to melt the powder, but rather reflect the radiated energy. As a result, the light-colored regions of the layer remain in unfused powdered form. To fabricate the next layer of the object, another layer of powder is deposited on top of the layer which has just been fabricated, and the printing and fusing processes are repeated for the next digital slice. This process continues until the object has been completely fabricated.

In such an additive manufacturing system, the 3D object may be built in a build chamber which houses various components of the build mechanism of the system, such as for example the print engine, fusing lamp(s), and the powder. To maintain proper operation of the system and high reliability, some system components, such as for example printheads of the print engine and the fusing lamp(s), are cooled during system operation. To do so, a clean supply of air, filtered to remove contaminants in the atmosphere external to the system, is flowed into the build chamber and into some of these components. In some examples, the clean supply of air is cooling air which is used to clean at least some of the system components. Some system components could be damaged if the air becomes contaminated. One source of air contamination is small particles of certain types of build material, such as for example powder, which become airborne and suspended as particulates, either inside or outside the system. Air contaminated with powder particulates should be prevented from escaping the additive manufacturing system into the air outside the system. One way to avoid these situations is to hermetically seal the interior of the additive manufacturing system to the external atmosphere. In addition, some hermetically sealed additive manufacturing systems may also fill the interior with an inert gas during 3D object fabrication. The hermetic seals prevent air from the atmosphere external to the system from entering the system, and also prevent the gases inside the system from escaping into the external atmosphere. However, hermetically sealing the entire additive manufacturing system enclosure can be quite expensive, both in parts and in manufacturing process costs. Access doors and their hermetic seals can become product reliability issues which increase service and/or warranty costs. And supplies of the inert gases are an on-going expense.

Referring now to the drawings, there is illustrated an example of an additive manufacturing system that uses clean air for certain purposes, which may in some examples include cooling. Various closed volumes of the system are not completely hermetically sealed during operation (a condition defined herein as "unsealed"), allowing leaks at which the ambient air outside the system and the air within the different closed volumes of the system could come into contact. As such, ambient air could enter the additive manufacturing system, and gases from the system could escape to the external atmosphere. To inhibit or prevent such situations, various regions of the system are maintained at different pressures in order to control the direction of air leaks, both within the system and between the system and its external environment. The chosen leakage directions inhibit or prevent leakage of ambient air into the system, and inhibit or prevent leakage of powder particulates from the system to the external atmosphere. The use of air within the system, rather than an inert gas, is more convenient and less costly, as it eliminates the need to supply these gases to the system. Also, the omission of hermetic seals reduces the parts count (no such seals are used); simplifies certain system subsystems and parts (e.g. sheet metal parts can have open corners); decreases the manufacturing cost of the system; and/or reduces the cost of ownership of the system.

Considering now an additive manufacturing system, and with reference to FIG. 1, the additive manufacturing system 100 includes an air supply enclosure 110 and a processing chamber 140. An air pathway 170 connects the air supply enclosure 110 and the processing chamber 140.

The system 100 is disposed in an ambient air environment 105. The ambient air in the environment 105 is at an atmospheric pressure.

The air supply enclosure 110 houses a body of clean cooling air for the system 100 during operation. The air supply enclosure 110 is unsealed. Due to the lack of sealing, the enclosure 110 can be open to the ambient air environment 105 in at least one location. The enclosure 110 may also be open to the processing chamber 140 at another location 125

The processing chamber 140 houses the build mechanism of the system and the 3D object as it is being additively manufactured. The processing chamber 140 is unsealed. Due to the lack of sealing, the processing chamber 140 can be open to the ambient air environment 105 in at least one location 145 of the chamber 140, in addition to being open to the air supply enclosure at location 125.

The air pathway 170 provides an air passage for the clean air in the air supply enclosure 110 to flow 175 into the processing chamber 140. In some examples, the air pathway 170 may include, may be coupled to, or may be formed within other components, such as for example an air duct, an air conduit, an air cooling circuit, a chamber, a fan, a functional subsystem of the additive manufacturing system, and/or other components.

The pressure in the air supply enclosure 110 is maintained at a first pressure greater than the ambient air pressure in the environment 105. This pressure differential between the enclosure 110 and the ambient air environment 105 determines the direction of air leakage 117 that occurs through the location 115. The pressure differential inhibits unfiltered ambient air from outside the system 100 from leaking into the air supply enclosure 110. Instead, if leakage 117 through the location 115 does occurs, it is clean air from the enclosure 110 that leaks out of the enclosure 110 to the atmosphere of the ambient environment 105 external to the system 100.

The pressure in the processing chamber 140 is maintained at a second pressure less than the ambient air pressure in the environment 105. This pressure differential between the processing chamber 140 and the ambient air environment 105 determines the direction of air leakage 147 that occurs through the location 145. The pressure differential inhibits air in the processing chamber 140, which may have been contaminated with powder particulates, from leaking out of the processing chamber 140 to the atmosphere of the ambient environment 105 external to the system 100. Instead, if leakage 147 through the location 145 does occurs, it is ambient air from the environment 105 external to the system 100 that leaks into the processing chamber 140.

In addition, the pressure differential between the processing chamber 140 and the air supply enclosure 110 determines the direction of leakage 127 that occurs through the location 125. The pressure differential inhibits the contaminated air in the processing chamber 140 from leaking into the air supply enclosure 110. Instead, if leakage 127 through the location 125 does occur, it is clean air from the enclosure 110 that leaks into the processing chamber 140.

Figure 2:
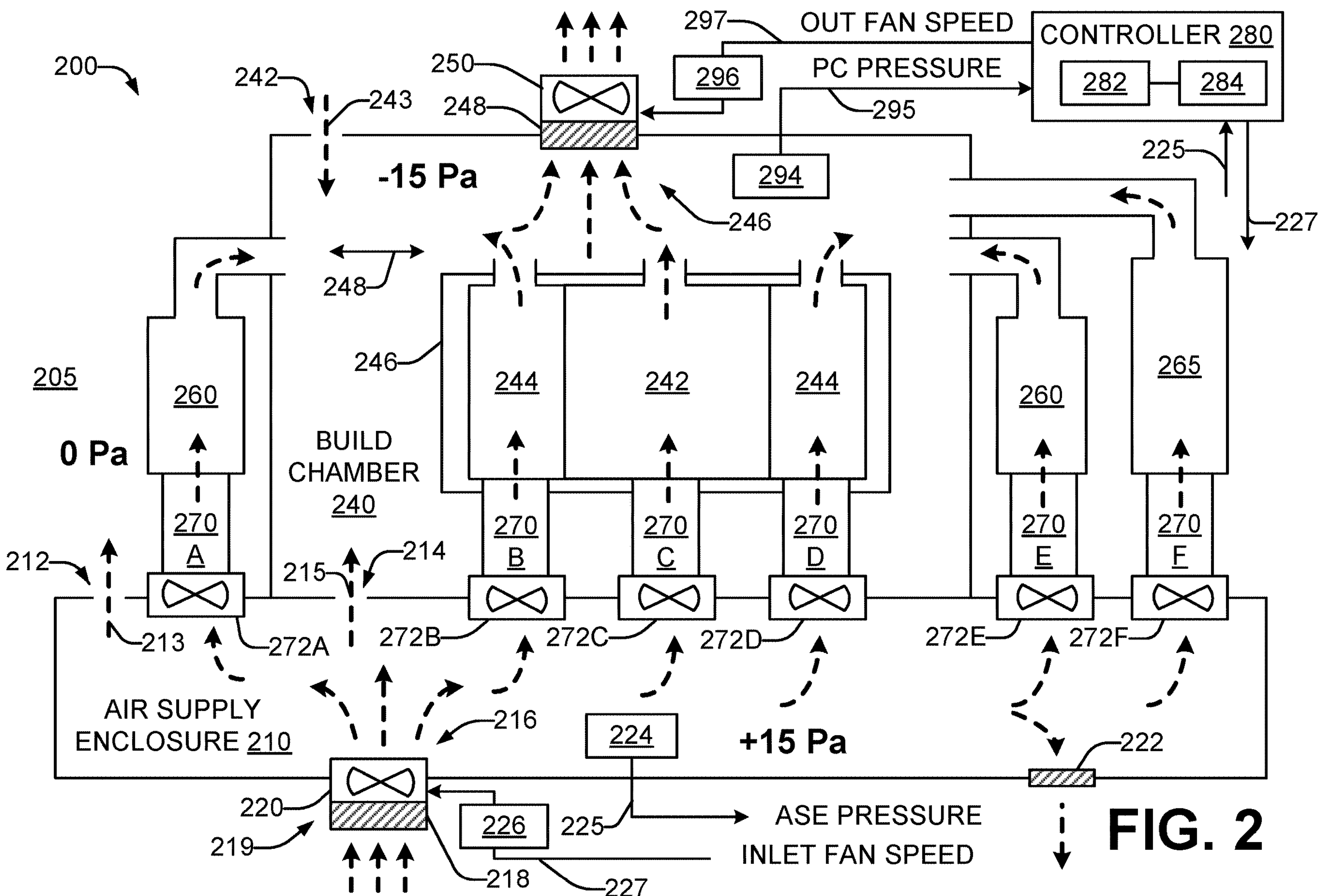
FIG. 2 is a schematic representation of another additive manufacturing system in accordance with an example of the present disclosure.

Considering now another additive manufacturing system, and with reference to FIG. 2, the additive manufacturing system 200 includes an air supply enclosure 210, a build chamber 240, and air ducts 270A-270F, which in some examples are the same as or similar to the air supply enclosure 110, processing chamber 140, and air duct 170 (FIG. 1) respectively. The dashed lines in FIG. 2 indicate the direction of air flow within the system 200, as is described below.

The build chamber 240 includes a print engine 242 and at least one heat source 244. In one example, a heat source 244 may be an infrared fusing lamp. The print engine 242 and heat source(s) 244 are mounted on a moveable carriage 246. The carriage 246 is controllably movable in a direction 248. In some examples, the print engine 242, heat source(s) 244, and carriage 246 are part of a build mechanism disposed in the build chamber 240. The build chamber 240 is one example of a processing chamber 140 (FIG. 1) of an additive manufacturing system. In various examples, an additive manufacturing system may include alternative and/or additional processing chambers.

Figure 3:
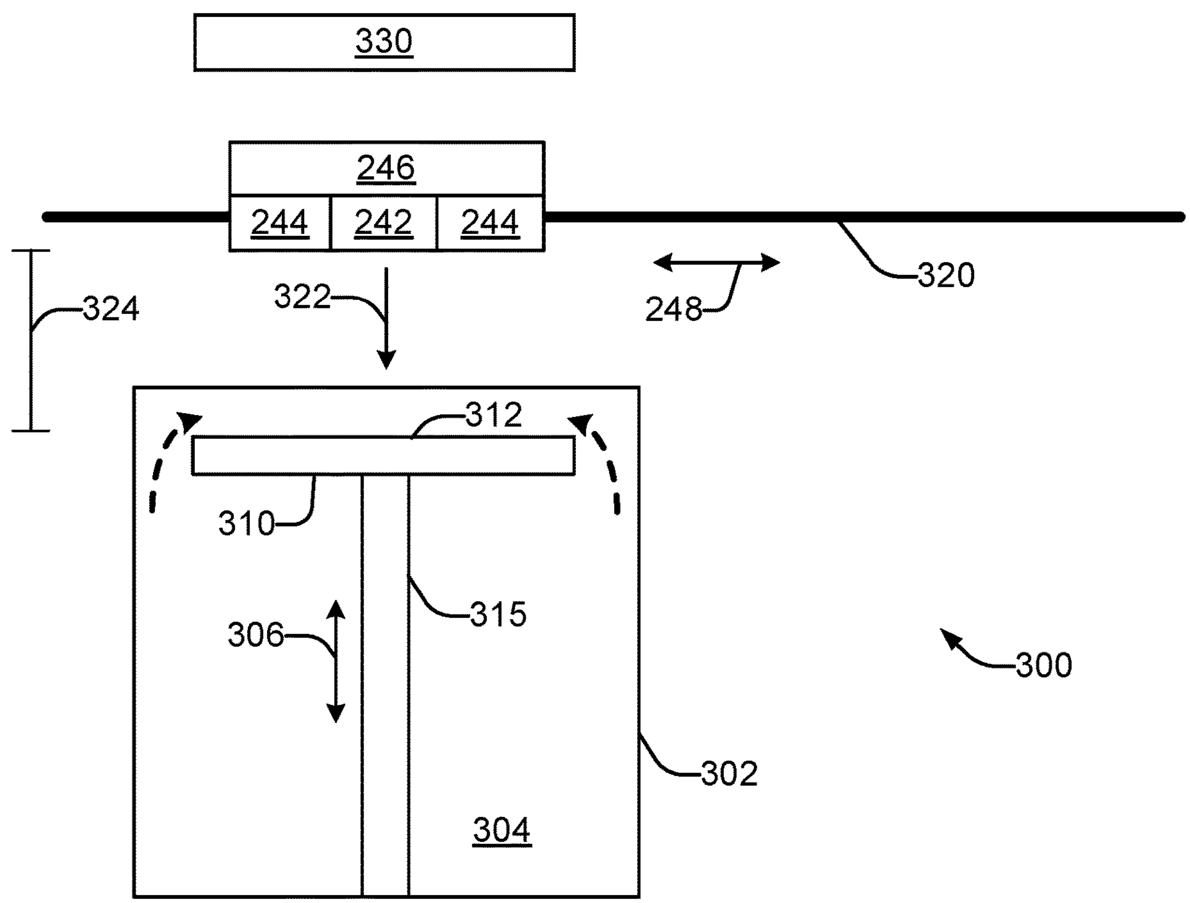
FIG. 3 is a schematic side view representation of a build mechanism usable with the additive manufacturing system of FIG. 2 in accordance with an example of the present disclosure.

Before discussing the system 200 further, consider with reference to FIG. 3 one example build mechanism 300. The build mechanism 300 is disposed in the build chamber 242 of some example systems 200. A bucket 302 contains a supply of build material 304, which may be light-colored powder, useable to fabricate a 3D object. A plate 310 is coupled to an elevating support mechanism 315 which can raise or lower the printing surface 310 in the direction 306. A top surface of the plate 310 is a printing surface (or build surface) 312 of the build mechanism 300 for the first layer of a 3D object. During fabrication of a 3D object, the plate 310 is initially positioned so that the printing surface 312 is at its initial location to receive the first layer. The surface is then lowered, and a powder lifting mechanism (not shown) causes some of the powder 304 to move from a build material store below the plate 310 into a feed tray (not shown) at an edge of the plate. A spreading mechanism (not shown) then arranges the powder 304 into a powder layer of a desired thickness on the printing surface 312.

The print engine 242 then controllably emits drops of a fusing agent in the direction 322 onto the regions of the powder 304 on the printing surface 312 which correspond to the slice of the 3D object to be printed. The print engine 242 may employ thermal or piezo printhead printing technology to emit the drops. In one example, printheads (not shown) in the print engine 242 collectively span the width of the printing surface 312 (i.e. the direction into and out of FIG. 2). In one example, multiple printheads are disposed endto-end in a staggered arrangement which spans the width of the printing surface 312. The carriage 246 is controllably movable in the direction 248 by a positioning mechanism such that the printheads can print on any position across the length of the surface 312 (i.e. the span of the surface 312 in the horizontal direction of FIG. 2). In one example, the positioning mechanism may include a slider bar 320 along which the carriage 246 is moved. In one example, the drops are emitted in a single pass of the print engine 242 over the printing surface 312.

In some examples, the powder 304 on the printing surface 312 is preheated using a fixed-position heat source 330, which may be an infrared lamp which evenly preheats all of the powder 304 on the printing surface 312. In some examples the powder 304 may be preheated to a temperature near, but below, its melting point. After the fusing agent has been printed onto the powder 304, the heat source(s) 244 are then passed over the entire printing surface 312. The regions of the powder 304 on which the dark colored liquid have been deposited absorb sufficient radiated energy from the heat source(s) 244 to melt the powder 304 in those regions. The melted powder 304 fuses together, and fuses to any previously-fabricated layer underneath. However, the regions of the powder 304 on which the dark colored liquid have not been deposited do not absorb sufficient radiated energy from the heat source(s) 244 to melt the powder 304; instead these light-colored powder regions reflect at least some of the radiated energy. As a result, the light-colored regions remain in unfused form. In one example, the melting and fusing is accomplished during a single pass of the heat source(s) 244 over the print surface 312. In one example, the carriage 246 moves in one direction to emit the drops from the print engine 242, and then moves in the opposite direction to melt and fuse the powder 304.

To fabricate the next layer of the object, the plate 310 is lowered further into the bucket 302 by the support mechanism 315 by an amount corresponding to the thickness of a layer, and powder 304 in the bucket 302 is formed into a new powder layer as explained above. The printing and fusing processes described above are then repeated to fabricate the next layer. This process continues until the desired 3D object has been completely fabricated.

In some examples, the carriage 246, including the print engine 242 and heat source(s) 244, is disposed substantially parallel to, and quite close to, the printing surface 312. In one example, they are spaced apart by a distance 324 of about 2.3 millimeters, and the carriage 246 can move at a velocity of 20 inches per second. As a result, the movement of the carriage 246 during fabrication can cause some of the powder 304 to become airborne and contaminate the air by forming powder particulates in the air around the print engine 242. Powder may also become airborne in other ways, such as when the liquid droplets impact the powder layer, and/or by the mechanism which forms the powder into a layer on the printing surface 312. The powder particulates and contaminated air are undesirable, as discussed heretofore.

Returning to the additive manufacturing system 200, and again with reference to FIG. 2, the air supply enclosure 210 and the build chamber 240 are unsealed. Leakage can occur between the ambient air environment 205 outside the system 200 and the air supply enclosure 210 at opening 212; between the ambient air environment 205 outside the system 200 and the build chamber 240 at opening 242; and/or between the air supply enclosure 210 and the build chamber 240 at opening 214. The openings 212, 214, 242 are representative of locations at which the air supply enclosure 210 and the build chamber 240 are unsealed; there can be many such openings, at many different locations in the enclosure 210 and chamber 240.

To avoid contaminated air in the build chamber 240 from entering either the ambient environment 205 and/or the air supply enclosure 210, and to avoid unfiltered ambient air in the ambient environment 205 from entering the air supply enclosure 210, the pressures in the air supply enclosure 210 and the build chamber 240 are controlled relative to each other and to the ambient environment 205. As discussed hereinafter, the pressure in the air supply enclosure 210 is maintained above the atmospheric pressure in the ambient environment 205, and the pressure in the build chamber 240 is maintained below the atmospheric pressure in the ambient environment 205. By doing so, the direction of leakage at the openings 212, 214, 242 is controlled. Any leakage at location 212 will be leakage of clean air in the air supply enclosure 210 into the ambient environment 205. Any leakage at location 214 will be leakage of clean air in the air supply enclosure 210 into the build chamber 240. And any leakage at location 242 will be leakage of unfiltered ambient air in the ambient environment into the build chamber 240. In one example, the ambient environment is at a pressure of 0 Pa (Pascals); the air supply enclosure 210 is maintained within a positive pressure range that is nominally a pressure of +15 Pa; and the build chamber 240 is maintained within a negative pressure range that is nominally a pressure of −15 Pa. The magnitudes of the specific nominal pressures and pressure ranges utilized may be large enough to ensure that there are no local pressure effects in the enclosure 210 or build chamber 240 that interfere with the desired direction of leakage, but small enough to minimize fan size and energy usage for their operation.

Clean air is generated by a fan 220 and a filter 218 coupled to an inlet 216 of the air supply enclosure 210. In some examples the fan 220 and/or the filter 218 may be disposed at the inlet 216, or they may be spaced away from the inlet 216 and connected to the inlet 216 by a duct. The fan 220 has a flow rate sufficient to pull sufficient air through the filter 218 and into the fan intake 219 to supply clean air to the build chamber 240 at a given total flow rate, to compensate for leakage through the openings 212, 214, and to maintain the positive pressure in the enclosure 210. The filter 218 is of an appropriate size and composition to prevent particles (particulates) above a predetermined size from entering the enclosure 210. In some examples, the enclosure 210 also includes a baffle 222 at a surface of the enclosure 210. The baffle 222 may include exit holes sized to allow a certain flow of clean air to escape from the enclosure 210 to the ambient environment 205 at a given pressure differential across the baffle 222. In this way the baffle 222 can assist in maintaining the pressure in the enclosure 210 within the desired pressure range, for example when the amount of air flow from the enclosure 210 to the build chamber 240 is varied.

Contaminated air is removed from the build chamber 240 by a fan 250 and a filter 248 disposed at an outlet 246 of the build chamber 240. In some examples the fan 250 and/or the filter 248 may be disposed at the outlet 246, or they may be spaced away from the outlet 246 and connected to the outlet 246 by a duct. The fan 250 has a flow rate sufficient to expel sufficient contaminated air through the filter 248 to compensate for leakage through the openings 242, 214, and to maintain the negative pressure in the build chamber 240. The filter 248 is of an appropriate size and composition to prevent powder particulates in the contaminated air within the build chamber 240 from passing through the filter 248 and being expelled into the ambient environment 205 by the fan 250.

Air ducts 270A through 270F receive cool cleaning air from the air supply enclosure 210. In some examples, one of fans 272A through 272F supplies clean air from the air supply enclosure 210, through the corresponding air duct 270A through 270F, which delivers it to a corresponding subsystem of the system 200. Fan 272C and duct 270C deliver clean air to the print engine 242 disposed in the build chamber 240. Fans 272B, 272D and ducts 270B, 270D deliver clean air to the two heat sources 244 disposed in the build chamber 240. Flowing clean air onto or past the print engine 242 and heat sources 244 inhibits or reduces buildup of powder particulates on the print engine 242 and heat sources 244.

In some examples, the system 200 also includes other subsystems which receive clean air during system operation but which are not disposed within the build chamber 240. In some examples, the pressure in the subsystems 260, 270 is uncontrolled. However, the pressure differential in the subsystems 260, 270 between the air supply enclosure 210 at their intake and the build chamber 240 at their outlet ensures that air flows from these subsystems 260, 270 into the build chamber 240, rather than in the opposite direction. Preventing contaminated air from the build chamber 240 from entering the subsystems 260, 270 maintains their cleanliness.

In some examples, the total aggregated working flow rate of fans 272A-272F, plus the leakage rates of flows 213 and 215 at openings 212 and 214, is lower than the maximum flow rate of fan 220. In addition, the total aggregated working flow rates of fans 272A-272F, plus the leakage flow rates of flows 243 and 215 at openings 242 and 214 is lower than the maximum flow rate of fan 250. In one example, fans 220, 250 each have a maximum flow rate of 10 kilograms/minute; the total aggregated working flow rate of fans 272A-272F is 6 kilograms/minute; and the rates of leakage flows 213, 215, 243 are each 0.500 kilograms/minute. This ensure that fans 220, 250 can maintain the desired pressures in air supply enclosure 210 and build chamber 240. In a steady-state situation, the aggregated working flow rates plus the leakage flow rates are equal to the working flow rate of the corresponding fan 220, 250. The term "working flow rate" denotes the flow rate of a fan operating at an intended fan speed. The term "leakage rate" of a flow denotes the flow rate through an opening.

In some examples, the fans 220, 250 operate at a fixed speed. In other examples, the speeds of the fans 220, 250 are dynamically controlled based on the measured pressure in the air supply enclosure 210 and build chamber 240 respectively. Dynamically controlling the fan speed can allow the pressure to be maintained within a narrower pressure range than fans which operate at a fixed speed.

In some examples, the system 200 includes a controller 280. In various examples, some or all of the controller 280 may be implemented in hardware, firmware, software, or a combination of these. In some examples where the controller 280 is implemented in whole or in part in firmware or software, the controller 280 may include a memory 282 having the firmware or software instructions, including instructions which measure the pressure and control the speed of the fans 220, 250. The controller 280 may also include a processor 284 which is communicatively coupled to the memory 282 to access and execute the instructions.

In examples that include dynamic fan speed control, a pressure sensor 224 is disposed in the air supply enclosure

210 to detect the air supply enclosure pressure, and a pressure sensor 294 is disposed in the air build chamber 240 to detect the build chamber pressure. The controller 280 measures the pressure sensor 224 to determine the pressure in the air supply enclosure 210. The pressure detected by the pressure sensor 224 is sent via signal 225 from the sensor 224 to the controller 280. The controller 280 is also coupled to a fan speed control 226. The fan speed control 226 receives a signal 227 from the controller 280 indicating the desired speed of the fan 220, and sends a corresponding signal to the fan 220 to set it to that desired speed. In operation, the controller 280 calculates the desired speed of the fan 220 based on the measured pressure, and commands the fan speed control 226 to set the fan 220 to the desired speed. If the pressure is too high, the fan speed is reduced, and if the pressure is too low, the fan speed is increased. By continuously repeating this process, closed-loop pressure control is implemented to maintain the pressure in the air supply enclosure 210 within a predetermined pressure range above the pressure in the ambient environment 205 of the system 200. Doing so can compensate for variations in the system, such as for example the buildup of particulates removed from the ambient air in the filter 218 over time. This in turn can increase the time interval between filter replacements.

The controller 280 similarly measures the pressure sensor 294 to determine the pressure in the build chamber 240. The pressure detected by the pressure sensor 294 is sent via signal 295 from the sensor 294 to the controller 280. The controller 280 is also coupled to a fan speed control 296. The fan speed control 296 receives a signal 297 from the controller 280 indicating the desired speed of the fan 250, and sends a corresponding signal to the fan 250 to set it to that desired speed. In operation, the controller 280 calculates the desired speed of the fan 250 based on the measured pressure, and commands the fan speed control 296 to set the fan 250 to the desired speed. If the pressure is too high, the fan speed is reduced, and if the pressure is too low, the fan speed is increased. By continuously repeating this process, closed-loop pressure control is implemented to maintain the pressure in the build chamber 240 within a predetermined pressure range below the pressure in the ambient environment 205 of the system 200. Doing so can compensate for variations in the system, such as for example the buildup of particulates removed from the contaminated build chamber air in the filter 248 over time. This in turn can increase the time interval between filter replacements.

In addition to controlling the fan speed, in some example the controller 280 can also control various other functions and operations of the system 200. These can include the movement of the carriage 246, the ejection of drops of the liquid from the print engine 242, raising and lowering of the print surface 312 (FIG. 3) within the bucket 302, and operation of other functional subsystems of the additive manufacturing system.

Figure 4:
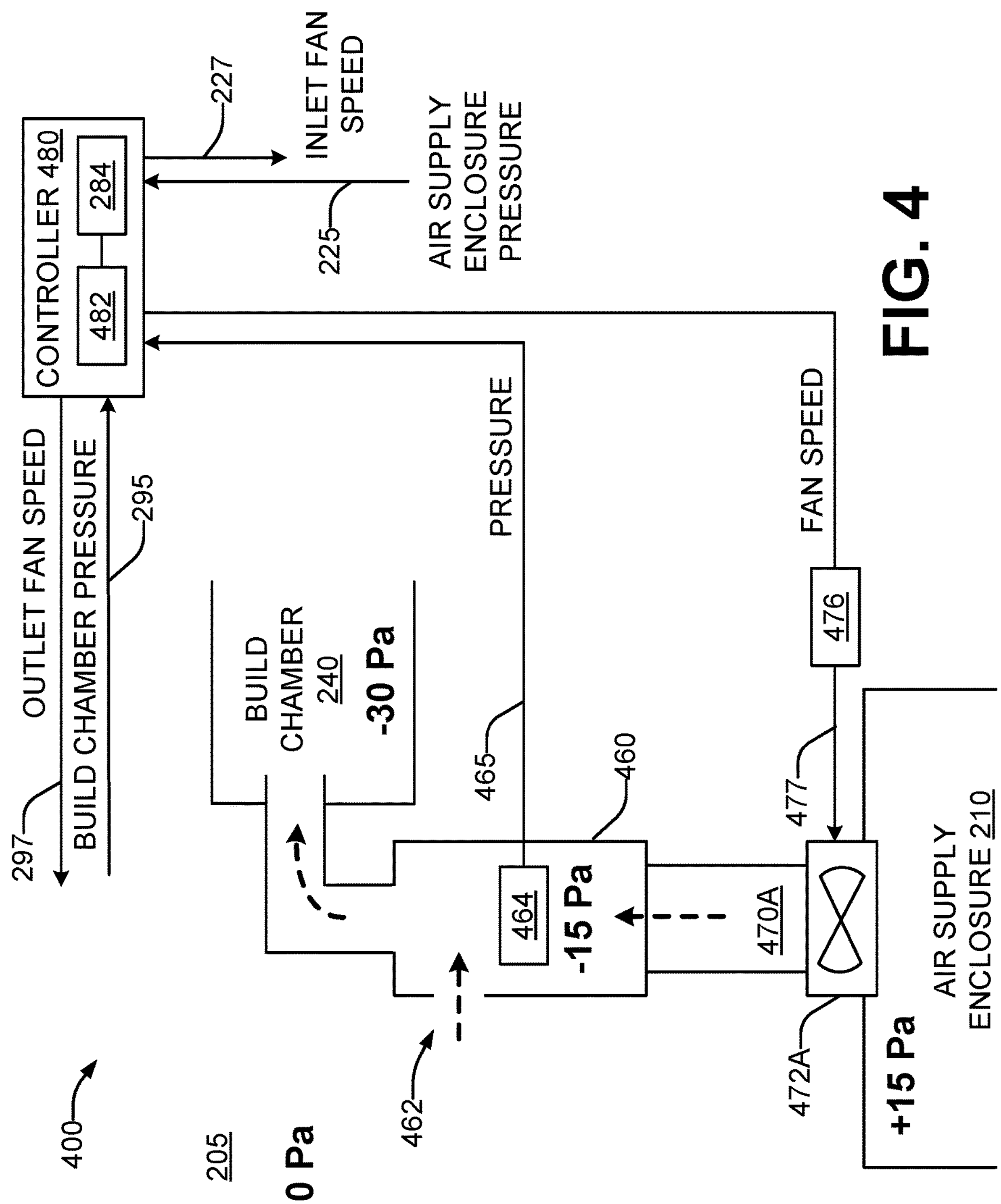
FIG. 4 is a schematic representation of the additive manufacturing system of FIG. 2 having an additional pressure-controlled zone in accordance with an example of the present disclosure.

As mentioned heretofore, the pressure in the subsystems 260, 270 of FIG. 2 is uncontrolled. However, in other examples it can be desirable to have at least one subsystem in which a subsystem pressure is controlled in a specified manner. Considering now an additive manufacturing system having an additional pressure-controlled zone, and with reference to FIG. 4, a system 400 is similar to system 200 (FIG. 2). For clarity of illustration, numerous features of the system 400 which are the same as or similar to the corresponding details of the system 200 are omitted from FIG. 4.

A subsystem 460 is disposed between, and external to, the air supply enclosure 210 and the build chamber 240, in a similar manner to subsystems 260, 270 (FIG. 2). A fan 472A delivers clean air from the air supply enclosure 210 through air duct 470A to the subsystem 460. Air exits the subsystem 460 into the build chamber 240.

A pressure sensor 464 is disposed in the subsystem 460 to measure the pressure therein. A fan speed control 476 is coupled to the fan 472A to control the fan speed. The pressure sensor 464 is the same as or similar to pressure sensors 224. 294, and the fan speed control 476 is the same as or similar to fan speed controls 226, 296 (FIG. 2).

In order to ensure that air flows between the air supply enclosure 210, the subsystem 460, and the build chamber 240 occur in the desired direction, the pressures in the air supply enclosure 210, the subsystem 460, and the build chamber 240 are maintained at specific levels relative to each other, and relative to the ambient air environment 205 external to the system 400. The pressure in the subsystem 460 is maintained at a pressure below the ambient air pressure of the environment 205, below the pressure in the air supply enclosure 210, and above the pressure in the build chamber 240. In one example, where the ambient environment is at a pressure of 0 Pa, the air supply enclosure 210 is maintained at a pressure of +15 Pa, the subsystem 460 is maintained at a pressure of −15 Pa, and the build chamber 240 is maintained at a pressure of −30 Pa. As a result of these pressure differentials, clean air flows from the air supply enclosure 210 into the subsystem 460, and from the subsystem 460 into the build chamber 240. Contaminated air from the build chamber 240 does not flow back into the subsystem 460, and air from the subsystem 460 does not flow back into the air supply enclosure 210.

Furthermore, in examples where the subsystem 460 is unsealed, the direction of air leakage between the subsystem 460 and the ambient air environment 205 at an opening 462 in the subsystem 460 can be controlled by the pressure maintained in the subsystem 460. By maintaining the pressure in the subsystem 460 below the pressure of the ambient air environment 205, any air leakage will be from the environment 205 into the subsystem 460. In some examples, a subsystem 460 which produces contaminated air. For example, the subsystem 460 may be a service station that cleans fluid and/or powder from printheads, and maintaining the pressure in the subsystem 460 below the pressure of the ambient air environment 205 will inhibit or prevent particulates in the subsystem 460 from escaping through the opening 462 into the ambient air environment 205.

In another example, if the pressure maintained in the subsystem 460 were to be changed from −15 Pa to +7 Pa, any air leakage would occur in the opposite direction, from the subsystem 460 to the ambient air environment 205.

The system 400 includes a controller 480, which may be the same as or similar to the controller 280 (FIG. 2). In some examples where the controller 280 is implemented in whole or in part in firmware or software, the controller 480 may include a memory 482 having firmware or software instructions, including instructions which measure the pressure in the subsystem 460 and control the speed of the fan 472A. The controller 480 may also include a processor 284 which is communicatively coupled to the memory 482 to access and execute the instructions. The controller 480 measures the pressure in the subsystem 460 using the sensor 464, and controls the speed of the fan 472A using the fan speed control 476, in the same or similar manner as described heretofore for the controller 280 (FIG. 2).

Considering now a method of operating an additive manufacturing system, and with reference to FIG. 5, a method 500 begins at 510 by pressurizing clean air in an unsealed air supply enclosure to a first pressure above ambient air pressure to inhibit unfiltered ambient air from leaking into the air supply enclosure 510. In some examples, at 512, ambient air from outside the printer is drawn into the unsealed air supply enclosure through a filter to generate the clean air. In some examples, at 514, the first pressure is measured, and at 516 a pressure control arrangement is adjusted to maintain the first pressure within a first pressure range. In some examples, the pressure control arrangement may include a pressure sensor, a fan speed control module, and a controller.

At 520, the clean air from the air supply enclosure is flowed to an unsealed build chamber. At 530, a 3D part is fabricated in the build chamber. As a by-product of the fabrication process, the air in the build chamber becomes contaminated with particulates. The particulates may include airborne particles of a powder used to fabricate the 3D part.

At 540, the build chamber is depressurized to a second pressure below the ambient air pressure to inhibit the particulates from leaking out of the build chamber to the atmosphere external to the printer. In some examples, at 542, the contaminated air from the build chamber is expelled to the atmosphere outside the system through a filter which retains the powder particulates in the build chamber. In some examples, at 544, the second pressure is measured, and at 546 a pressure control arrangement is adjusted to maintain the second pressure within a second pressure range.

From the foregoing it will be appreciated that the system, method, and medium provided by the present disclosure represent a significant advance in the art. Although several specific examples have been described and illustrated, the disclosure is not limited to the specific methods, forms, or arrangements of parts so described and illustrated. For example, examples of the disclosure are not limited to additive manufacturing systems, but may be any type of system having unsealed portions in which control of the direction of air leakage between unsealed portions and/or with the external environment id desired.

This description should be understood to include all combinations of elements described herein, and claims may be presented in this or a later application to any combination of these elements. The foregoing examples are illustrative, and different features or elements may be included in various combinations that may be claimed in this or a later application. Terms of orientation and relative position (such as "top," "bottom," "side," and the like) are not intended to indicate a particular orientation of any element or assembly, and are used for convenience of illustration and description. Unless otherwise specified, operations of a method claim need not be performed in the order specified. Similarly, blocks in diagrams or numbers (such as (1), (2), etc.) should not be construed as operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of at least one such element, neither requiring nor excluding two or more such elements. Where the claims recite "having", the term should be understood to mean "comprising".

What is claimed is:

1. A three-dimensional printer, the printer comprising:

an unsealed air supply enclosure for clean, filtered air maintained at a first pressure above an ambient air pressure to inhibit unfiltered ambient air from leaking into the air supply enclosure;

an unsealed processing chamber housing a build mechanism of the three-dimensional printer and an object when the object is being additively manufactured, the unsealed processing chamber maintained at a second pressure below the ambient air pressure to inhibit processing chamber air from leaking-out of the processing chamber an unsealed subsystem coupled to the unsealed air supply enclosure and the unsealed processing chamber;

a fan to control air flow through the unsealed subsystem;

a controller configured to operate the fan at a rate to maintain the unsealed subsystem at a third pressure between the first and second pressures and below the ambient air pressure to inhibit air in the unsealed subsystem from leaking, wherein the third pressure is selected to inhibit a build powder flow outside the unsealed subsystem; and an air pathway disposed between the air supply enclosure and the processing chamber to provide the filtered air from the air supply enclosure to the processing chamber.

2. The three-dimensional printer of claim 1, comprising:

the fan coupled to an inlet of the air supply enclosure to produce the first pressure in the air supply enclosure; and a first filter coupled to an intake of the first fan to remove particulates from the unfiltered ambient air drawn into the air supply enclosure by the first fan.

3. The three-dimensional printer of claim 2, comprising:

a first pressure sensor disposed in the air supply enclosure to detect the first pressure;

a first fan speed control to set an operating speed of the first fan; and the controller coupled to the first pressure sensor and the first fan speed control to maintain the first pressure within a predetermined first pressure, range.

4. The three-dimensional printer of claim 3, comprising:

a duct fan disposed in the air pathway to flow the clean air from the air supply enclosure to the processing chamber, the duct fan having a duct fan working flow rate less than a maximum flow rate of the first fan to ensure that the first fan can maintain the first pressure in the air supply enclosure.

5. The three-dimensional printer of claim 1, comprising:

a build mechanism disposed in the processing chamber to produce a 3D part during a fabrication operation that further generates the processing chamber air by contaminating the clean air with particulates of a build material;

a second fan coupled to an outlet of the processing chamber to produce the second pressure and expel processing chamber air from the processing chamber; and a second filter disposed between the outlet and the second fan to trap the particulates in the processing chamber air to inhibit the particulates from escaping the processing chamber.

6. The three-dimensional printer of claim 5, comprising:

a second pressure sensor disposed in the processing chamber {o detect the second pressure;

a second fan speed control to set an operating speed of the second fan; and the controller coupled to the second pressure, sensor and the second fan speed control to maintain the second pressure within a predetermined second pressure range.

7. The three-dimensional printer of' claim 5, comprising:

a duct fan disposed in the air pathway to flow the clean air from the air supply enclosure to the processing chamber, the duct fan having a duct fan working flow rate less than a maximum flow rate of the second fan to ensure that the second fan can maintain the second pressure in the processing chamber.

8. The three-dimensional printer of claim 1, wherein the unsealed air supply enclosure comprises sheet metal sides with unsealed corners and the first pressure to allow clean air to leak out of the unsealed air supply enclosure to an ambient environment external to the system, and wherein the second pressure is to allow ambient air to leak into the processing chamber from the ambient environment and inhibit the processing chamber air from leaking out of the processing chamber into the ambient environment or into the air supply enclosure.

9. The three-dimensional printer of claim 1, wherein the unsealed processing chamber comprises:

a plate having a top surface on which layers of a desired object are formed by additive manufacturing; and an elevating support mechanism to raise and lower the plate within the processing chamber as layers of the object are formed.

10. The three-dimensional printer of claim 1, further comprising a print engine disposed in the processing chamber, the unsealed air supply enclosure being connected to provide air to the print engine through an air duct that is separate from and in addition to the air pathway.

11. The three-dimensional printer of claim 1, further comprising a heat source disposed in the processing chamber, the unsealed air supply enclosure being connected to provide air to the heat source through an air duct that is separate from and in addition to the air pathway.

12. A three-dimensional printer, the printer comprising:

an unsealed air supply enclosure for clean, filtered air maintained at a first pressure above an ambient air pressure to inhibit unfiltered ambient air from leaking into the air supply enclosure;

an unsealed processing chamber housing a build mechanism of the three-dimensional printer and an object when the object is being additively manufactured, the unsealed processing chamber maintained at a second pressure below the ambient air pressure to inhibit processing chamber air from leaking out of the processing chamber;

an air pathway disposed between the air supply enclosure and the processing chamber to provide the filtered air from the air supply enclosure to the processing chamber; and at least one subsystem that is outside of and separate from the processing chamber, the unsealed air supply enclosure being connected to provide air to the at least one subsystem through an air duct that is separate from and in addition to the air pathway, the at least one subsystem connected to pass air from the at least one subsystem into the processing chamber.

13. The three-dimensional printer of claim 12, further comprising a duct to pass air from the at least one subsystem into the processing chamber.

14. A three-dimensional printer, the printer comprising:

an unsealed air supply enclosure for clean, filtered air maintained at a first pressure above an ambient air pressure to inhibit unfiltered ambient air from leaking into the air supply enclosure;

an unsealed processing chamber housing a build mechanism of the three-dimensional printer and an object when the object is being additively manufactured, the unsealed processing chamber maintained at a second pressure below the ambient air pressure to inhibit processing chamber air from leaking out of the processing chamber;

an air pathway disposed between the air supply enclosure and the processing chamber to provide the filtered air from the air supply enclosure to the processing chamber;

a subsystem disposed between the unsealed air supply enclosure and the unsealed processing chamber;

a fan to deliver air from the air supply enclosure, through the subsystem, to the processing chamber;

a pressure sensor in the subsystem; and a controller to receive a signal from the pressure sensor and control the speed of the fan.

15. The three-dimensional printer of' claim 14, wherein the controller is to maintain pressure in the subsystem below an ambient pressure, below a pressure of the air supply enclosure and above a pressure in the processing chamber.

* * * * *